US012639272B2

(12) United States Patent
Cheng

(10) Patent No.: US 12,639,272 B2
(45) Date of Patent: May 26, 2026

(54) HIERARCHICAL FILE PARSING SYSTEM AND METHOD

(71) Applicant: WISTRON CORP., New Taipei City (TW)

(72) Inventor: Cheng Chan Cheng, New Taipei City (TW)

(73) Assignee: WISTRON CORP., New Taipei City (TW)

( * ) Notice: Subject to any disclaimer, the term of this patent is extended or adjusted under 35 U.S.C. 154(b) by 22 days.

(21) Appl. No.: 18/405,002

(22) Filed: Jan. 5, 2024

(65) Prior Publication Data

US 2025/0173312 A1 May 29, 2025

(30) Foreign Application Priority Data

Nov. 29, 2023 (TW) ................................. 112146346

(51) Int. Cl.
*G06F 16/00* (2019.01)
*G06F 16/11* (2019.01)
*G06F 16/185* (2019.01)

(52) U.S. Cl.
CPC .......... *G06F 16/185* (2019.01); *G06F 16/116* (2019.01)

(58) Field of Classification Search
CPC ............................. G06F 16/183; G06F 16/116
USPC ......................................................... 707/829
See application file for complete search history.

(56) References Cited

U.S. PATENT DOCUMENTS

| | | | |
|---|---|---|---|
| 9,444,956 B2 * | 9/2016 | Lin | H04N 1/00411 |
| 2019/0079753 A1 * | 3/2019 | Makkar | G06F 16/13 |
| 2021/0157845 A1 * | 5/2021 | Dodel | G06N 3/08 |
| 2022/0092099 A1 * | 3/2022 | Bae | G06F 16/3344 |
| 2023/0010202 A1 * | 1/2023 | Fujimoto | G06N 3/0455 |
| 2023/0022673 A1 * | 1/2023 | Derzsy | G06N 5/022 |
| 2023/0047717 A1 * | 2/2023 | Dubey | G06F 16/2365 |
| 2023/0101817 A1 | 3/2023 | Sinha | |

FOREIGN PATENT DOCUMENTS

| | | | | |
|---|---|---|---|---|
| CN | 112380812 A | * | 2/2021 | G06V 30/412 |
| CN | 111797630 B | * | 10/2022 | G06N 3/044 |

OTHER PUBLICATIONS

TW Office Action dated Aug. 5, 2024 in Taiwan application No. 112146346.

* cited by examiner

*Primary Examiner* — Monica M Pyo
(74) *Attorney, Agent, or Firm* — McClure, Qualey & Rodack, LLP

(57) ABSTRACT

A hierarchical file parsing method includes: obtaining a reference string; obtaining a plurality of first strings from a plurality of files, wherein each file includes a table with a plurality of text fields and a plurality of numerical fields, and each first string is associated with the plurality of text fields; calculating a first similarity between the reference string and each first string, filtering out a plurality of candidate files from the plurality of files, obtaining a plurality of second strings from the plurality of candidate files, wherein the plurality of second strings is associated with the plurality of text fields, calculating a second similarity between the reference string and each second string, and outputting one of the plurality of numerical fields according to each second string when the second similarity is greater than a second threshold.

10 Claims, 7 Drawing Sheets

| Parameter | | | Min. | Typ. | Max. | Unit | Remarks |
|---|---|---|---|---|---|---|---|
| Power Supply Voltage | | $V_{DD}$ | 3.0 | 3.3 | 3.6 | V | Note 1 |
| Permissible Input Ripple Voltage | | $V_{RF}$ | -10% VDD | - | +10% VDD | V | Note 4 |
| CABC Control Level | High Level | | 2 | - | 3.6 | V | |
| | Low Level | | 0 | - | 0.5 | V | Note 5 |
| BIST Control Level | High Level | | 2 | - | 3.6 | V | |
| | Low Level | | 0 | - | 0.5 | V | |
| Power Supply Inrush Current | Inrush | | - | - | 2 | A | Note 3 |
| Power Supply Current | Mosaic | $I_{DD}$ | - | - | 196.9 | mA | |
| | Red | | - | - | 363.6 | mA | |
| | Green | | - | - | 363.6 | mA | |
| | Blue | | - | - | 363.6 | mA | |
| Power Consumption | Mosaic | $P_M$ | - | - | 0.65 | W | |
| | Red | $P_R$ | - | - | 1.2 | W | |
| | Green | $P_G$ | - | - | 1.2 | W | |
| | Blue | $P_B$ | - | - | 1.2 | W | |
| | BLU | $P_{BL}$ | - | - | 3.5 | W | Note 2 |
| | Total | $P_{Total}$ | - | 3.15 | 3.7 | W | Note 1 |

P₃

,Parameter,Min.,Typ.,Max.,Unit, Remarks,Power Supply Voltage,VDD,Permissible Input Ripple Voltage,VRF,CABC Control Level,High Level,Low Level,BIST Control Level,High Level,Low Level,Power Supply Inrush Current, Inrush,Power Supply Current, Mosaic,Red,Green,Blue,IDD, Power Consumption,Mosaic, Red,Green, Blue,BLU,Total,PM, PR,PG,PB,PBL, PTotal

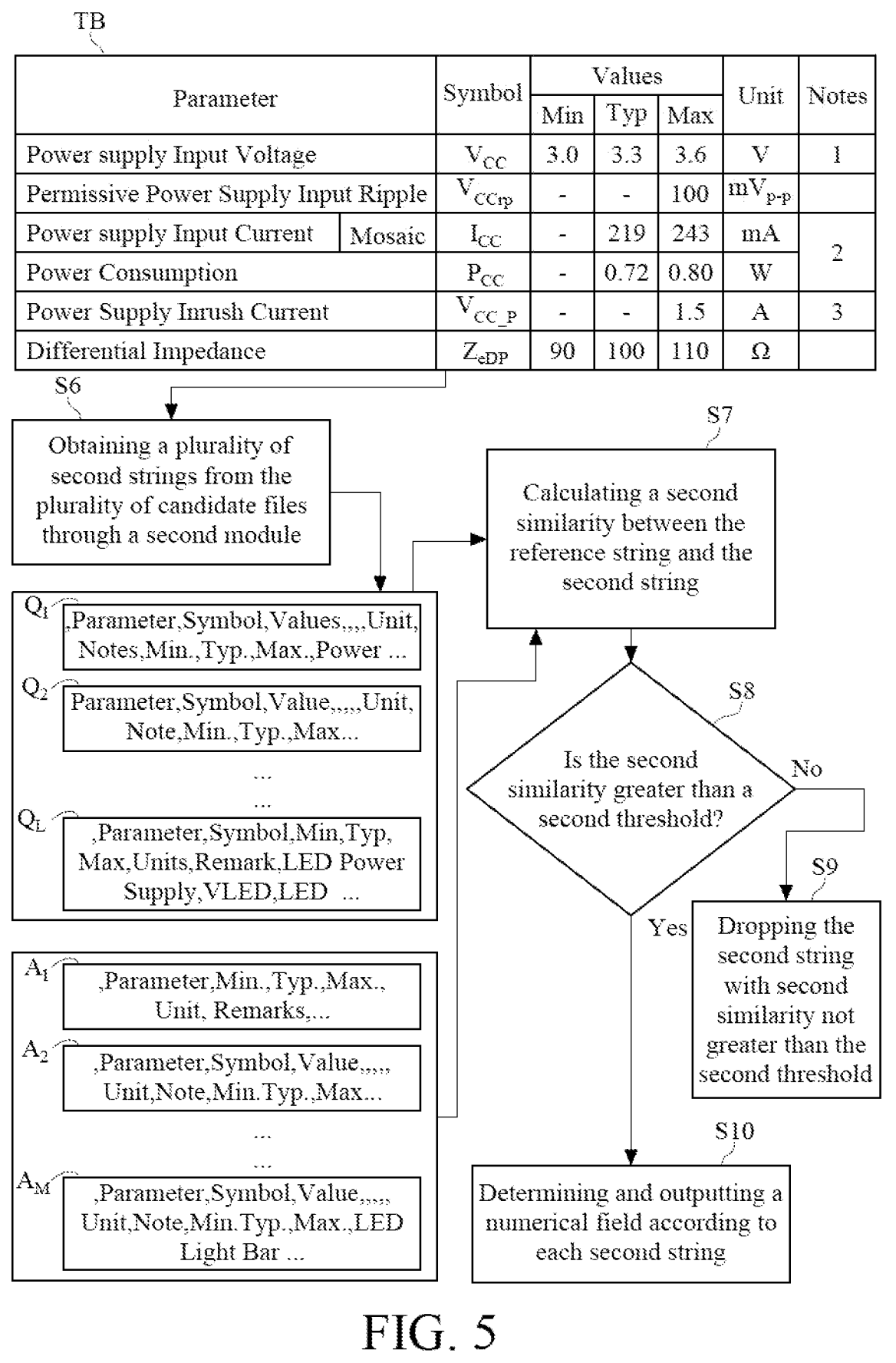

| Parameter | | Symbol | Values | | | Unit | Notes |
|---|---|---|---|---|---|---|---|
| | | | Min | Typ | Max | | |
| Power supply Input Voltage | | $V_{CC}$ | 3.0 | 3.3 | 3.6 | V | 1 |
| Permissive Power Supply Input Ripple | | $V_{CCrp}$ | - | - | 100 | $mV_{p\text{-}p}$ | |
| Power supply Input Current | Mosaic | $I_{CC}$ | - | 219 | 243 | mA | 2 |
| Power Consumption | | $P_{CC}$ | - | 0.72 | 0.80 | W | |
| Power Supply Inrush Current | | $V_{CC\_P}$ | - | - | 1.5 | A | 3 |
| Differential Impedance | | $Z_{eDP}$ | 90 | 100 | 110 | Ω | |

S6

Obtaining a plurality of second strings from the plurality of candidate files through a second module $Q_1$ ,Parameter,Symbol,Values,,,,Unit, Notes,Min.,Typ.,Max.,Power ...

$Q_2$ Parameter,Symbol,Value,,,,,Unit, Note,Min.,Typ.,Max...

...
...

$Q_L$ ,Parameter,Symbol,Min,Typ, Max,Units,Remark,LED Power Supply,VLED,LED ...

$A_1$ ,Parameter,Min.,Typ.,Max., Unit, Remarks,...

$A_2$ ,Parameter,Symbol,Value,,,,,, Unit,Note,Min.Typ.,Max...

...
...

$A_M$ ,Parameter,Symbol,Value,,,,, Unit,Note,Min.Typ.,Max.,LED Light Bar ...

S7

Calculating a second similarity between the reference string and the second string

S8

Is the second similarity greater than a second threshold?

No

S9

Dropping the second string with second similarity not greater than the second threshold Yes

S10

Determining and outputting a numerical field according to each second string

FIG. 5

HIERARCHICAL FILE PARSING SYSTEM AND METHOD

CROSS-REFERENCE TO RELATED APPLICATIONS

This non-provisional application claims priority under 35 U.S.C. § 119(a) on Patent Application No(s). 112146346 filed in Taiwan on Nov. 29, 2023, the entire contents of which are hereby incorporated by reference.

BACKGROUND

1. Technical Field

The present disclosure relates to file parsing and artificial intelligence, particularly to a hierarchical file parsing system and method.

2. Related Art

In the process of product development and design, engineers need to study numerous files to obtain the technical specifications required for design and development. Due to the diverse sources of files from different clients and manufacturers, consistency in file formats cannot be achieved.

However, due to the multitude of file formats, file interpretation heavily relies on the professional capabilities of engineers, leading to a high potential for interpretation errors. Current methods for automatic file parsing are primarily rule-based. While this approach makes model establishment easy, the created model cannot modify parsing rules, cannot learn from untrained data, and incur high ongoing maintenance costs.

SUMMARY

According to one or more embodiment of the present disclosure, a hierarchical file parsing method performed by a computing device comprises: obtaining a reference string; obtaining a plurality of first strings from a plurality of files through a first module, wherein each of the plurality of files comprises a table, the table comprises a plurality of text fields and a plurality of numerical fields, and the plurality of first strings is associated with the plurality of text fields; calculating a first similarity between the reference string and each of the plurality of first strings; filtering out a plurality of candidate files from the plurality of files, wherein the first similarity of each of the plurality of candidate files is greater than a first threshold; obtaining a plurality of second strings from the plurality of candidate files through a second module, wherein the plurality of second strings is associated with the plurality of text fields, and a number of the plurality of second strings is less than or equal to a number of the plurality of first strings; calculating a second similarity between the reference string and each of the plurality of second strings; and outputting one of the plurality of numerical fields according to each of the plurality of second strings when the second similarity is greater than a second threshold.

According to one or more embodiment of the present disclosure, a hierarchical file parsing system includes a storage device and a computing device. The storage device is configured to store a plurality of instructions, a plurality of reference strings, and a plurality of files. The computing device is electrically connected to the storage device and configured to execute the plurality of instructions to perform a plurality of operations. The plurality of operations comprises: obtaining one of the plurality of reference strings; obtaining a plurality of first strings from the plurality of files through a first module, wherein each of the plurality of files comprises a table, the table comprises a plurality of text fields and a plurality of numerical fields, and the plurality of first strings is associated with the plurality of text fields; calculating a first similarity between the reference string and each of the plurality of first strings; filtering out a plurality of candidate files from the plurality of files, wherein the first similarity of each of the plurality of candidate files is greater than a first threshold; obtaining a plurality of second strings from the plurality of candidate files through a second module, wherein the plurality of second strings is associated with the plurality of text fields, and a number of the plurality of second strings is less than or equal to a number of the plurality of first strings; calculating a second similarity between the reference string and each of the plurality of second strings; and outputting one of the plurality of numerical fields according to each of the plurality of second strings when the second similarity is greater than a second threshold.

The aforementioned context of the present disclosure and the detailed description given herein below are used to demonstrate and explain the concept and the spirit of the present application and provides the further explanation of the claim of the present application.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIG. 4 is a schematic diagram of a step in FIG. 2;

FIG. 5 is a schematic diagram of an example of a second stage;

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present disclosure. The following embodiments further illustrate various aspects of the present disclosure, but are not meant to limit the scope of the present disclosure.

Figure 1:
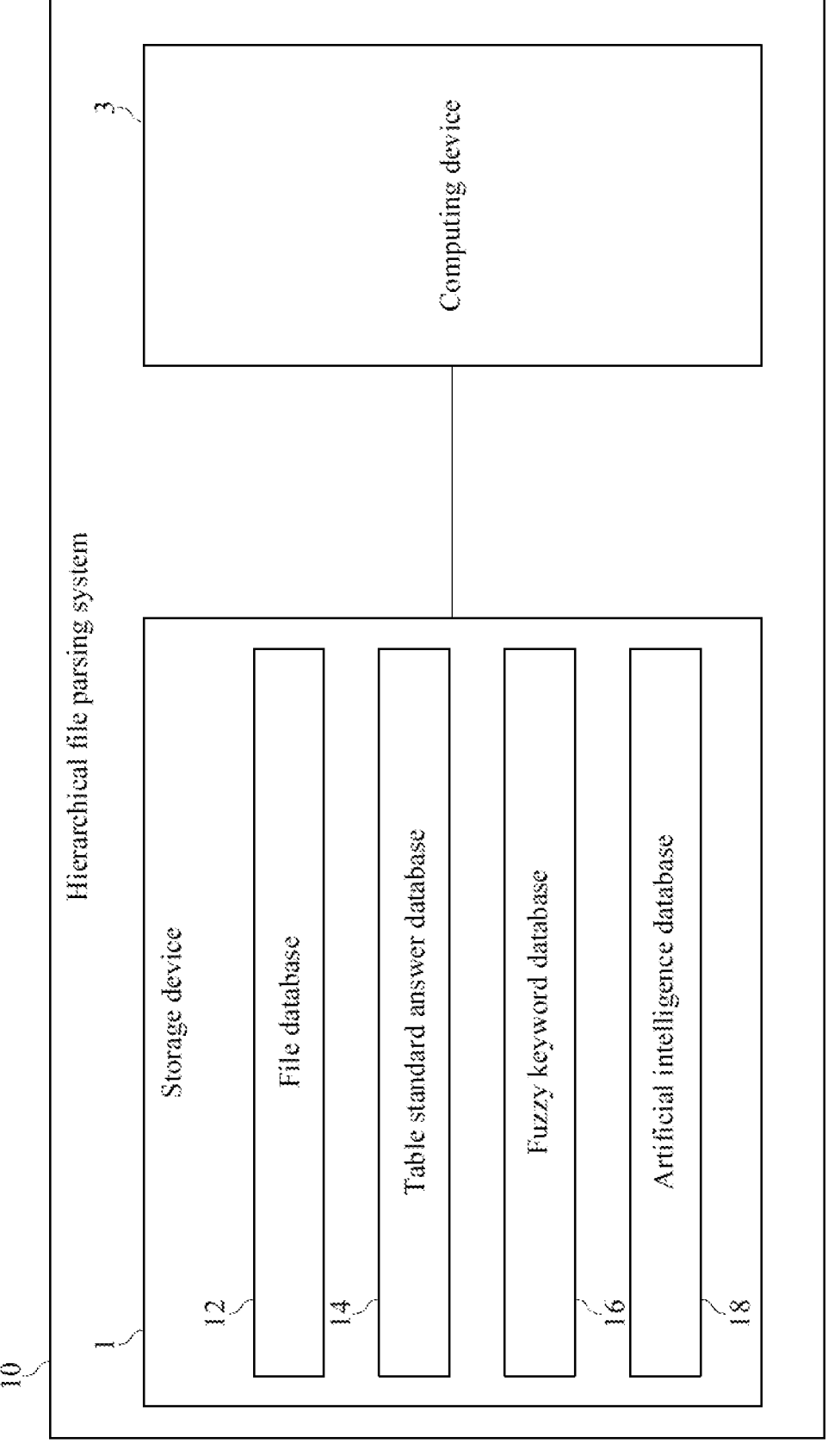
FIG. 1 is a block diagram of a hierarchical file parsing system according to an embodiment of the present disclosure.

FIG. 1 is a block diagram of a hierarchical file parsing system according to an embodiment of the present disclosure. As shown in FIG. 1, the hierarchical file parsing system 10 includes a storage device 1 and a computing device 3. The storage device 1 is configured to store a plurality of files, a plurality of reference strings, a plurality of keywords, and a plurality of instructions. The plurality of files is stored in a file database 12, the plurality of reference strings is stored in a table standard answer database 14, the plurality of keywords is stored in a fuzzy keyword database 16 and an artificial intelligence database 18, and the plurality of instructions is stored in an area outside of the aforementioned databases. The computing device 3 is electrically connected to the storage device 1 and is configured to execute the plurality of instructions to perform a plurality of operations, which are detailed in FIG. 2.

In an embodiment, the storage device 1, for example, is volatile and/or non-volatile memory. Non-volatile memory includes read-only memory (ROM), programmable ROM (PROM), electrically programmable ROM (EPROM), electrically erasable and programmable ROM (EEPROM), flash memory, phase-change random access memory (PRAM), magnetic RAM (MRAM), resistive RAM (RRAM), and/or ferroelectric RAM (FRAM). Volatile memory may include dynamic RAM (DRAM), static RAM (SRAM), and/or synchronous DRAM (SDRAM). In another embodiment, the storage device 1, for example, is at least one of a hard disk drive (HDD), solid-state drive (SSD), compact flash (CF) card, secure digital (SD) card, microSD card, miniSD card, extreme digital (xD) card, or memory stick. The present disclosure does not limit the hardware type of the storage device 1.

In an embodiment, the computing device 3 may be implemented using one or more of the following examples: personal computer, network server, microcontroller (MCU), application processor (AP), field programmable gate array (FPGA), Application Specific Integrated Circuit (ASIC), system-on-a-chip (SOC), deep learning accelerator, or any electronic device with similar functionality. The present disclosure does not limit the hardware type of the computing device 3.

Figure 2:
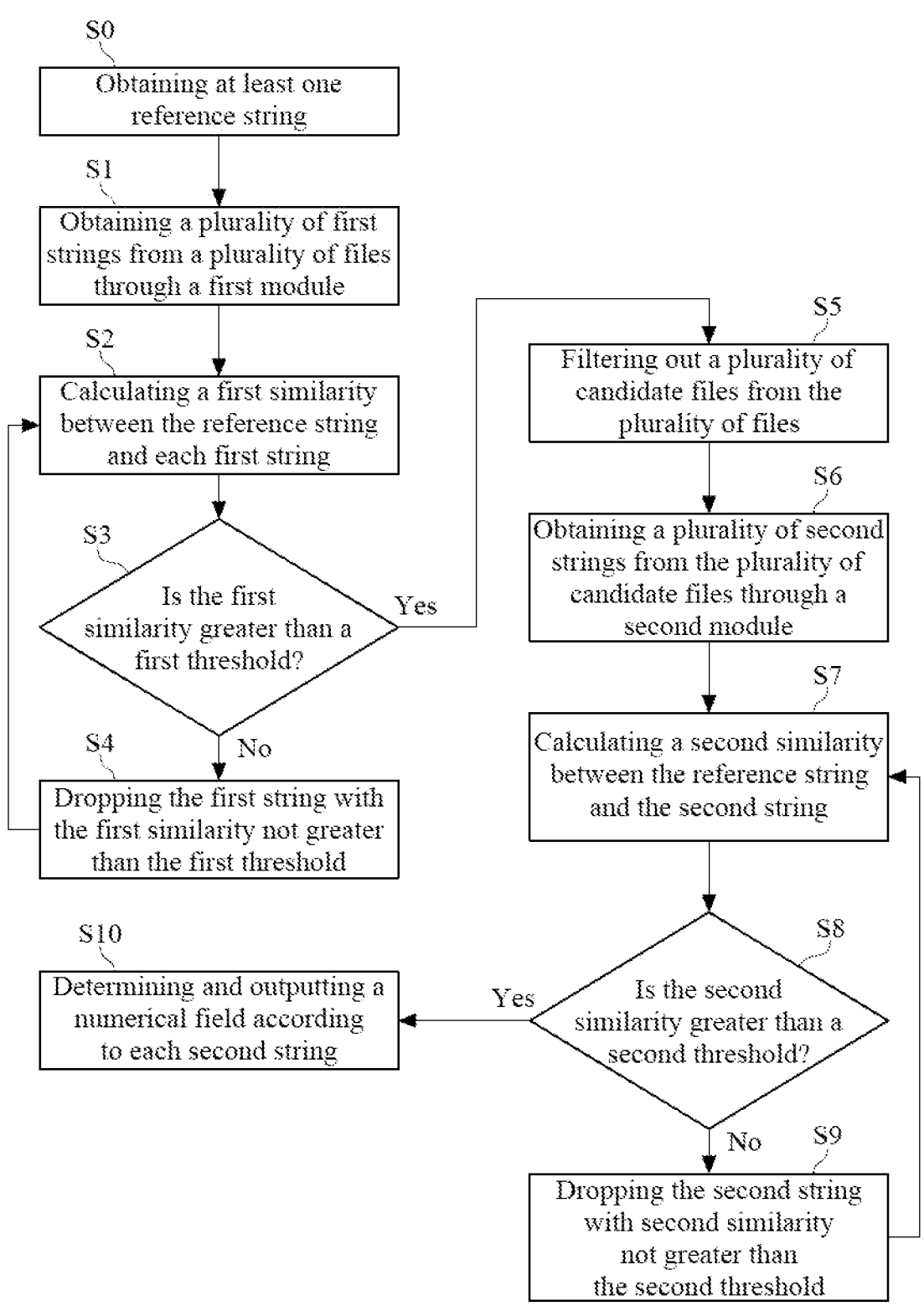
FIG. 2 is a flowchart of a hierarchical file parsing method according to an embodiment of the present disclosure.

FIG. 2 is a flowchart of a hierarchical file parsing method according to an embodiment of the present disclosure. As shown in FIG. 2, this method comprises steps S0 to S10. The method is divided into three stages for data filtering and obtaining the final data. The first stage includes steps S0 to S5, the second stage includes steps S6 to S9, and the third stage includes step S10.

Figure 3:
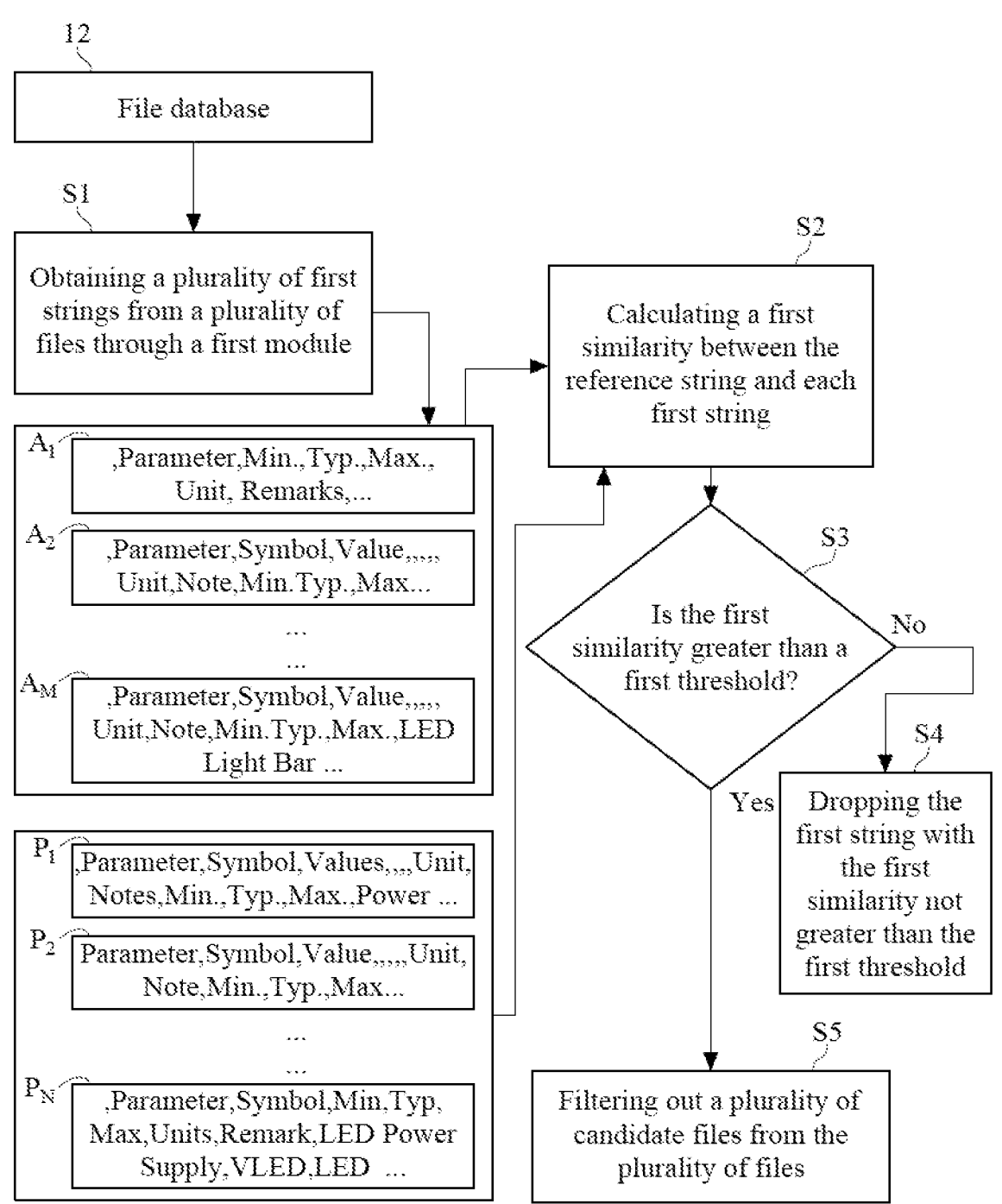
FIG. 3 is a schematic diagram of an example of a first stage.

The purpose of the first stage is to filter out low-relevance table data, retain high-relevance table data, thereby reducing the time and cost during the execution of the second stage. FIG. 3 is a schematic diagram of an example of a first stage;

Before step S0 is performed, the user stores at least one file in the file database 12 of the storage device 1. In an embodiment, each file is, for example, a PDF file, but the present disclosure is not limited to this. In an embodiment, the quantity of at least one file is multiple. The file content includes one or more tables, and each table comprises text fields and numerical fields.

In step S0, the computing device 3 obtains at least one reference string, such as $A_1, A_2, \ldots, A_M$ shown in FIG. 3, from the table standard answer database 14 of the storage device 1. These reference strings $A_1, A_2, \ldots, A_M$ are used as the basis for subsequent filtering of files. In an embodiment, the user pre-collects multiple tables that have been used to find data, and computing device 3 extracts reference strings from the text fields of each table through optical character recognition and stores them in the table standard answer database 14. The present disclosure does not limit the length or quantity of reference strings.

In step S1, the computing device 3 executes the first module to obtain a plurality of first strings from the plurality of files, such as $P_1, P_2, \ldots, P_N$ as shown in FIG. 3. Please refer to FIG. 3. In an embodiment, computing device 3 obtains the plurality of pre-stored files from the file database

12, and the first module is an open-source table parsing tool. Examples of free open-source parsing tools include PdfPlumber, PyPDF2, and PyMuPdf, but the present disclosure does not limit thereof. Taking PDF files as an example, since the table data in the file is in image format, the first module (such as an open-source table parsing tool) is configured to convert it into string format. FIG. 3 and FIG. 4 show illustrative examples of the above operation. In FIG. 3 and FIG. 4, each first string (such as the first string $P_1$) represents the text data (non-numerical data) in a table on a page of a file.

In another embodiment of step S1, the computing device 3 executes the plurality of instructions in the storage device 1 to convert the plurality of files from image format to text format, distinguish between text data and numerical data in the text format, and then save the text data as the plurality of first strings.

In step S2, the computing device 3 calculates a first similarity between the reference string and each first string. In an embodiment, the computing device 3 executes one of the following open-source string comparison models to calculate the first similarity.

1. Hugging Face: sentence-transformers/all-MiniLM-L6-v2;

2. GitHub: SeanLee97/xmnlp; and

3. GitHub: oborchers/Fast_Sentence_Embeddings.

The string comparison model can perform sentence similarity comparison and generate a comparison score as the first similarity. The first similarity reflects the similarity between the reference string and the first string, where a higher numerical value indicates greater similarity. In another embodiment, the computing device 3 may execute run a plurality of string comparison models and calculate a weighted average of the plurality of comparison scores as the first similarity.

There are two reasons for using open-source models in the present disclosure. First, to save the user's time in retraining the model. Second, because existing artificial intelligence models for sentence similarity are already mature, there is no need to spend effort to rebuild them. Implementing step S2 with existing open-source models is sufficient.

In step S3, the computing device 3 determines whether the first similarity is greater than a first threshold. In an embodiment, the first threshold is 0.95, but the present disclosure is not limited to this example value. If the determination in step S3 is no, proceed to step S4. If the determination in step S3 is yes, retain the current file as a candidate file TB and proceed to step S5.

In step S4, the computing device 3 drops the first string with the first similarity not greater than the first threshold.

Note that in schematic diagram of the example of FIG. 3, there are a total of N first strings $P_1, P_2, \ldots P_N$, so step S2 will be executed N times. Each execution of step S2 will generate M first similarities. In an embodiment, if there are at least K first similarities with values greater than the first threshold among the M first similarities, then the file corresponding to this first string (e.g., $P_1$) can be retained as a candidate file TB for use in the second stage. Otherwise, the first string is dropped. The present disclosure does not limit the values set for M, N, and K.

In step S5, the computing device 3 filters out a plurality of candidate files TB from the plurality of files. Overall, in steps S1 to S5 of the first stage, the plurality of first strings from all files in the storage device 1 are filtered through the lightweight table parsing module in step S1 and the noise filtering mechanism in steps S2 to S3, retaining files with a first similarity greater than the first threshold as candidate files TB. In an embodiment, the first threshold is set to 0.95, filtering out 95% of the files in the first stage. The remaining 5% of candidate files TB continue to the second stage for further filtering.

If the number of candidate files TB after the first-stage filtering is below a specified quantity (e.g., 2), two approaches can be adopted. The first approach: the computing device 3 arranges all first strings in descending order based on the first similarity and sequentially selects files corresponding to the first string with the highest first similarity as candidate files TB until the quantity of candidate files TB equals the specified quantity. The second approach: the computing device 3 reduces the first threshold (e.g., from 0.95 to 0.94) and verifies whether the quantity of candidate files TB exceeds the threshold. If not, it continues to reduce the first threshold until the quantity of candidate files TB is sufficient for the second stage.

The subsequent execution proceeds to the second stage (steps S6 to S9), where the candidate files TB filtered in the first stage are further filtered to retain accurate tables. As the second stage deals with a significantly reduced amount of data compared to the first stage, it saves costs and time needed for execution. Please refer to FIG. 5. FIG. 5 is a schematic diagram of an example of a second stage.

In step S6, the computing device 3 obtains a plurality of second strings, such as $Q_1$, $Q_2$, . . . , $Q_L$, from the plurality of candidate files TB through the second module, as shown in FIG. 5. Since the quantity of candidate files TB is less than the quantity of files in the first stage, the number L of the plurality of second strings is less than the number N of the plurality of first strings. Please refer to FIG. 5. In an embodiment, the second module is a cloud-based file table parsing module. In an embodiment, the accuracy of the cloud-based file table parsing module for the plurality of second strings is greater than the accuracy of the open-source table parsing tool for the plurality of first strings. For example, free open-source table parsing tools (adopted in step S1) may have issues such as incomplete table parsing, resulting in missing rows or fields in the table or errors in text recognition. In step S6, the computing device 3 executes a cloud-based file table parsing module such as Azure Table Recognizer or AWS Textract to obtain the plurality of second strings. Please refer to FIG. 5 for the example of the above operations. In FIG. 5, each second string (e.g., $Q_1$) represents text data (non-numeric data) from a table on a specific page of a candidate file TB.

In another embodiment of step S6, the computing device 3 executes the plurality of instructions stored in the storage device 1 to convert the plurality of candidate files TB from image format to text format, then distinguishes between text data and numerical data in the text format, and saves the text data as the plurality of second strings.

In step S7, the computing device 3 calculates a second similarity between the reference string and the second string, the specific implementation of which can refer to step S3.

In step S8, the computing device 3 determines whether the second similarity is greater than a second threshold. In an embodiment, the second threshold is 0.98, but the present disclosure is not limited to this example value. If the determination in step S8 is no, proceed to step S9. If the determination in step S8 is yes, proceed to step S10. The second threshold must be greater than the first threshold because the second stage uses a stricter threshold to obtain accurate tables by filtering out the candidate files TB filtered in the first stage.

In step S9, the computing device 3 drops the second strings with second similarity not greater than the second threshold.

Next is the third stage (steps S10), in which the computing device 3 obtains candidate sub-strings one by one from the accurately filtered tables obtained in the second stage for fuzzy comparison and artificial intelligence comparison. It retains candidate sub-strings belonging to correct keywords and excludes candidate sub-strings belonging to incorrect keywords.

Figure 6:
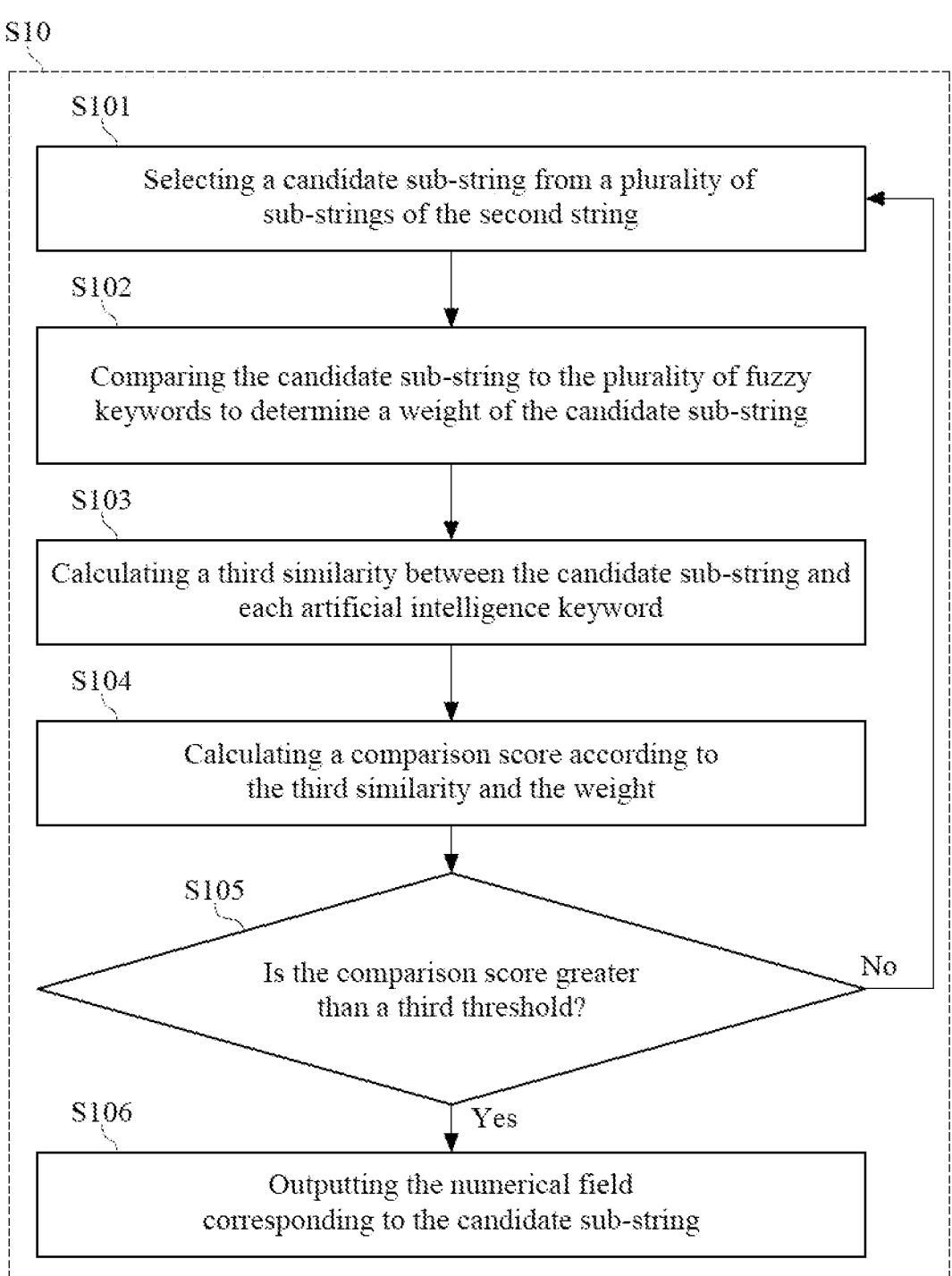
FIG. 6 is a detailed flowchart of a step in FIG. 2.

In step S10, the computing device 3 outputs numerical fields in the accurate table according to each of the plurality of second strings. Overall, step S10 evaluates whether there is data in the accurate tables filtered out in the second stage that can match the keywords recorded in the fuzzy keyword database 16 or the artificial intelligence database 18. If there is, it continues to output the data in the numerical fields of the accurate table. FIG. 6 is a detailed flowchart of step S10 in FIG. 2.

In step S101, the computing device 3 selects one candidate sub-string from the plurality of sub-strings of the second string. Please refer to FIG. 4 and FIG. 5. Assuming that the second string $Q_1$ is retained as the accurate table, it includes a plurality of candidate sub-strings such as "Parameter", "Symbol", "Values", "Unit", "Notes", "Min.", "Typ.", and so on. In an embodiment, the computing device 3 selects one candidate substring at a time to execute the process shown in FIG. 6, such as selecting "Parameter" for the first time, then selecting "Symbol" next, and so on.

Figure 7:
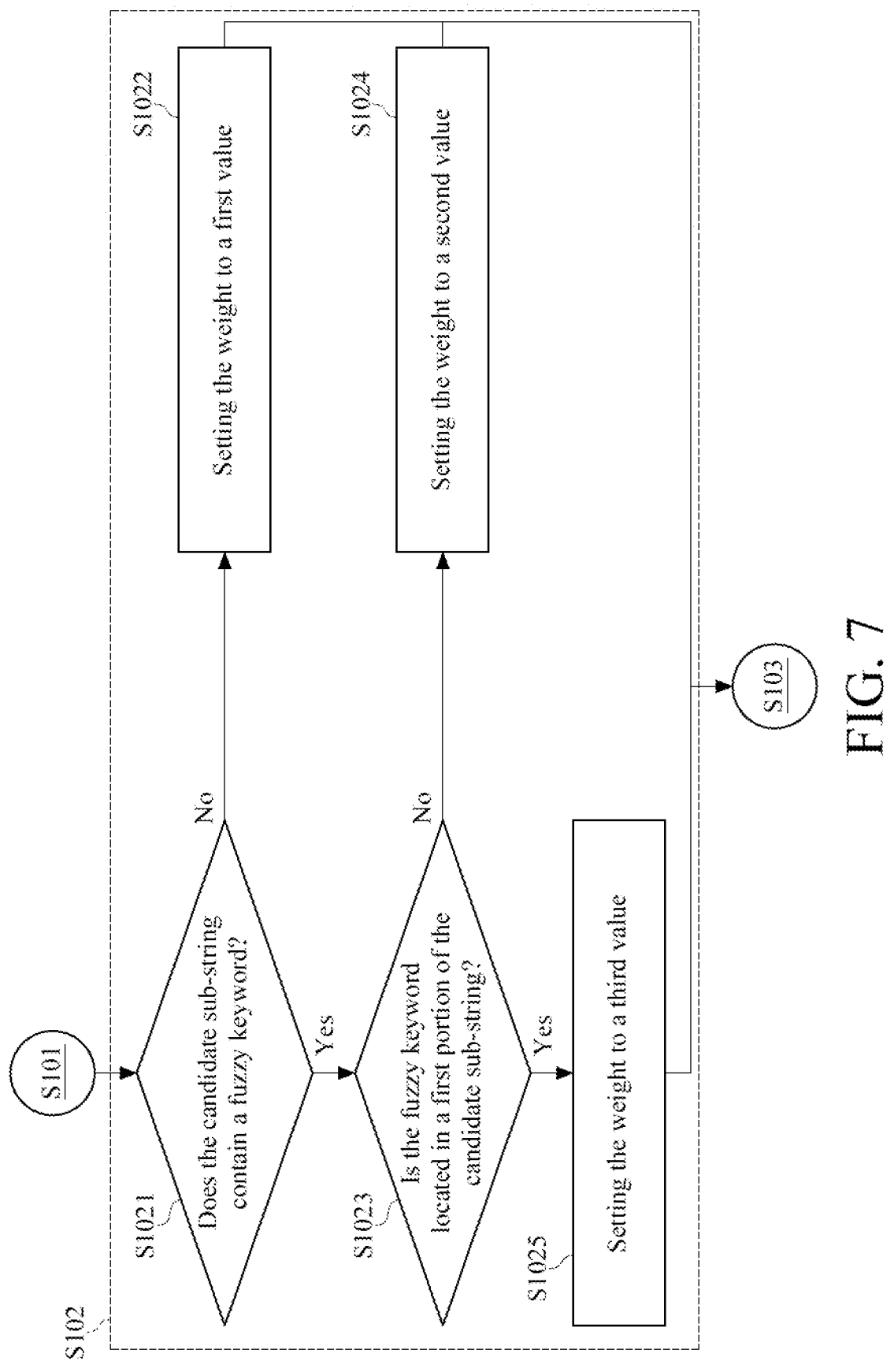
FIG. 7 a detailed flowchart of a step in FIG. 6.

In step S102, the computing device 3 compares the candidate sub-string to the plurality of fuzzy keywords in the fuzzy keyword database 16 to determine a weight of the candidate sub-string. In an embodiment, the number of executions of step S102 is the same as the number of fuzzy keywords, so the plurality of executions of step S102 will generate a plurality of weights, and the computing device 3 uses the maximum value among these weights for subsequent use. FIG. 7 is a detailed flowchart of step S102, including steps S1021 to S1025. The method of establishing the fuzzy keyword database 16 will be detailed later.

In step S1021, the computing device 3 generates a first determination according to whether the candidate sub-string contains a fuzzy keyword. If the first determination is no, then proceed to step S1022; if the first determination is yes, then proceed to step S1023.

In step S1022, the computing device 3 sets the weight to a first value and then proceeds to step S103.

In step S1023, the computing device 3 generates a second determination according to whether the fuzzy keyword is located in a first portion of the candidate sub-string. If the second determination is no, then proceed to step S1024; if the second determination is yes, then proceed to step S1025. In an embodiment, the candidate sub-string is composed of the first portion and a second portion. The first portion is located in the front half, and the second portion is located in the back half. For example, if the candidate sub-string is "power supply", the first portion is "power", and the second portion is "supply". If the candidate sub-string is "power", the first portion is "p", and the second part is "ower". The present disclosure does not specifically limit the string length in the first portion or the second portion.

In step S1024, the computing device 3 sets the weight to a second value and then proceeds to step S103.

In step S1025, the computing device 3 sets the weight to a third value and then proceeds to step S103. In an embodiment, the first value is less than the second value, and the second value is less than the third value. For example, the first value is 1.2, the second value is 1.5, and the third value is 1.8.

The process of FIG. 7 is explained with a practical example: assuming the candidate sub-string is "Power supply voltage", with the first portion being "Power" and the second portion being "supply voltage", assuming the fuzzy keyword database 16 contains four fuzzy keywords: "V", "I", "P", "Power", and the flow of steps S1021 to S1025 will be executed four times. The weight set the first time is the second value because the candidate sub-string "Power supply voltage" contains the fuzzy keyword "V", but the fuzzy keyword "V" is not located in the first portion "Power". The weight set the second time is the first value because the candidate sub-string "Power supply voltage" does not contain the fuzzy keyword "I". The weight set the third time is the third value because the candidate sub-string "Power supply voltage" contains the fuzzy keyword "P", and the fuzzy keyword "P" is located in the first part "Power." The weight set the fourth time is the third value because the fuzzy keyword "Power supply voltage" contains "Power", and the fuzzy keyword "Power" is located in the first portion "Power". In the end, the computing device 3 adopts the maximum value among these four weights, which is the third value, as the weight mentioned in step S102.

In step S103, the computing device 3 calculates a third similarity between the candidate sub-string and each artificial intelligence keyword in the artificial intelligence database 18. The calculation method of the third similarity can refer to the calculation method of the first similarity and the second similarity in steps S3 and S8. In an embodiment, a plurality of artificial intelligence keywords in the artificial intelligence database 18 is pre-established by the user, the first portion of each artificial intelligence keyword is extracted as a fuzzy keyword through a program or script and stored in the fuzzy keyword database 16.

In an embodiment, the number of executions of step S103 is the same as the number of artificial intelligence keywords. Therefore, multiple executions of step S103 will generate multiple third similarities, and the computing device 3 will use the maximum value among these third similarities in subsequent steps. Step S103 is explained with a practical example as follows: assuming the candidate sub-string is "Power supply voltage" and the artificial intelligence database 18 contains seven artificial intelligence keywords: "VLED", "ILED", "PLED", "VGG", "IGG", "PGG", "Power supply current". Step S103 will be executed seven times. The first time The third similarity between the artificial intelligence keyword "VLED" and the candidate sub-string "Power supply voltage" is calculated in the first round. The third similarity between the artificial intelligence keyword "ILED" and the candidate sub-string "Power supply voltage" is calculated in the second round, and so on. In the end, seven third similarities are generated. It is easy to see that the artificial intelligence keyword "Power supply current" is the most similar to the candidate sub-string "Power supply voltage" in a literal sense. Therefore, step S103 outputs the third similarity corresponding to the artificial intelligence keyword "Power supply current".

In step S104, the computing device 3 calculates a comparison score according to the third similarity and the weight. In an embodiment, the comparison score is the product of the third similarity and the weight.

In step S105, the computing device 3 determines whether the comparison score is greater than a third threshold. If the determination in step S105 is yes, it means that this candidate sub-string is a correct keyword, and the process proceeds to step S106. If the determination in step S105 is no, it means that this candidate sub-string is an incorrect keyword. This candidate sub-string will be dropped, and the process returns to step S101. The next candidate sub-string from the second string is selected, and the process repeats from step S102 to step S106. In an embodiment, the third threshold is, for example, 0.95, but the present disclosure does not limit the numerical setting of the third threshold.

In step S106, the computing device 3 outputs one of the plurality of numerical fields corresponding to the candidate sub-string. Specifically, in steps S2 and S7, the computing device 3 not only obtains the text in the text field of the table as the second string but also obtains numerical records in the numerical field of the table and records the corresponding relationship between these text and numerical values. Therefore, whenever the computing device 3 determines a correct keyword in step S106, it can output the corresponding numerical value according to this correct keyword and the aforementioned corresponding relationship in the numerical records.

In an embodiment, the process shown in FIG. 6 can be executed repeatedly and output numerical data that was not originally recorded in the accurate file. For example, the relationship among voltage V, current I, and power P is known to be V=I*P, and this relationship is stored in the storage device 1 in the form of instructions. Assume that the artificial intelligence keywords stored in the artificial intelligence database 18 includes "VGG", "IGG", and "PGG", and the candidate sub-string only contains "VCC" and "ICC" but not "PCC". Based on the above assumptions, after the process shown in FIG. 6 is executed twice in succession, the voltage value corresponding to VCC and the current value corresponding to ICC can be output at step S106 (by finding the text field VCC in the accurate table through the artificial intelligence keyword "VGG" and finding the text field ICC through the artificial intelligence keyword "IGG"). Then, the computing device 3 calculates the power value corresponding to PCC using the pre-stored instruction (V=I*P) and outputs it (PCC=VCC*ICC).

Although the data users want to search for may correspond to different keywords in various files, the differences between these keywords are not substantial. For example, the voltage keyword in file A is recorded as "VCC", while in file B, it is noted as "VGG". Therefore, it is only necessary to conduct keyword collection in the initial phase and store the collected keywords in the artificial intelligence database 18. Subsequently, even if new artificial intelligence keywords are no longer continuously collected, as long as there is not significant variation in the keywords corresponding to the data to be searched, users can still find the required information through the process illustrated in FIG. 6. For example, although keywords like VCC and ICC are not stored in the artificial intelligence database 18, as long as similar keywords such as VLED, ILED, VGG, or IGG have been stored in the artificial intelligence database 18, the process illustrated in FIG. 6 and FIG. 7 can still extract data containing VCC or ICC from files. In contrast, traditional rule-driven file parsing mechanisms in conventional techniques require continuous algorithm updates. The approach adopted by the present disclosure significantly reduces the time spent modifying file parsing programs and diminishes the need for users to regularly update the keyword database.

In summary, the hierarchical file parsing system and method proposed by the present disclosure have the following advantages:

1. It can quickly identify key values in professional files based on artificial intelligence technology, addressing the issue of engineers not knowing which keywords to use and thereby reducing overall search time.

2. Compared to the "rule-based" file parsing methods with fixed rules, the present disclosure eliminates the need to define new search rules for new file parsing requirements, saving developers' time and reducing labor costs.

3. The present disclosure employs open-source artificial intelligence models and a hierarchical concept for data filtering, reducing the time required for independent training of artificial intelligence models and accelerating development speed.

4. The design architecture of the present disclosure follows a hierarchical concept, making it highly flexible. Models or algorithms used in each hierarchy can be replaced, preventing any dependency on a specific package or vendor. This avoids potential issues in the future where a method or package becomes unsupported or outdated, leading to system malfunction.

Overall, the advantages of the present disclosure lie in the elimination of repetitive development tasks for developers, avoidance of repeated training of artificial intelligence models, and freedom from dependency on any specific method or package. This simplifies the otherwise complex steps, enhancing user convenience in operation.

Although embodiments of the present application are disclosed as described above, they are not intended to limit the present application, and a person having ordinary skill in the art, without departing from the spirit and scope of the present application, can make some changes in the shape, structure, feature and spirit described in the scope of the present application. Therefore, the scope of the present application shall be determined by the scope of the claims.

What is claimed is:

1. A hierarchical file parsing method, performed by a computing device, comprising:

obtaining a reference string;

obtaining a plurality of first strings from a plurality of files through a first module, wherein each of the plurality of files comprises table data, the table data is in an image format and comprises a plurality of text fields and a plurality of numerical fields, the plurality of first strings is associated with the plurality of text fields, the first module executed by the computing device is an open-source table parsing tool configured to convert the image format of each of the plurality of files to a string format;

calculating a first similarity between the reference string and each of the plurality of first strings;

filtering out a plurality of candidate files from the plurality of files, wherein the first similarity of each of the plurality of candidate files is greater than a first threshold;

obtaining a plurality of second strings from the plurality of candidate files through a second module, wherein the plurality of second strings is associated with the plurality of text fields, a number of the plurality of second strings is less than or equal to a number of the plurality of first strings, the second module executed by the computing device is a cloud-based file table parsing module, and an accuracy of the cloud-based file table parsing module for the plurality of second strings is greater than an accuracy of the open-source table parsing tool for the plurality of first strings;

calculating a second similarity between the reference string and each of the plurality of second strings; and outputting one of the plurality of numerical fields according to each of the plurality of second strings when the second similarity is greater than a second threshold;

wherein each of the plurality of second strings comprises a plurality of sub-strings, and outputting one of the plurality of numerical fields according to each of the plurality of second strings when the second similarity is greater than the second threshold comprises:

selecting a candidate sub-string from the plurality of sub-strings;

comparing the candidate sub-string to a plurality of fuzzy keywords in a fuzzy keyword database to determine a weight of the candidate sub-string;

calculating a third similarity between the candidate sub-string and each artificial intelligence keyword in an artificial intelligence database;

calculating a comparison score according to the third similarity and the weight; and outputting one of the numerical fields corresponding to the candidate sub-string when the comparison score is greater than a third threshold;

wherein comparing the candidate sub-string to the plurality of fuzzy keywords in the fuzzy keyword database to determine the weight of the candidate sub-string comprises:

generating a first determination according to whether the candidate sub-string contains one of the plurality of fuzzy keywords, wherein the candidate sub-string is composed of a first portion and a second portion;

generating a second determination according to whether one of the plurality of fuzzy keywords is located in the first portion;

set the weight to a first value when the first determination is no;

set the weight to a second value when the first determination is yes and the second determination is no; and set the weight to a third value when the first determination is yes and the second determination is yes;

wherein the first value is less than the second value, and the second value is less than the third value.

2. The hierarchical file parsing method of claim 1, wherein the second threshold is greater than the first threshold.

3. The hierarchical file parsing method of claim 1, further comprising: when the first similarity is not greater than the first threshold, reducing the first threshold and re-calculating the first similarity between the reference string and each of the plurality of first strings.

4. The hierarchical file parsing method of claim 1, wherein obtaining the plurality of first strings from the plurality of files through the first module comprises:

converting the plurality of files from the image format to the string format;

distinguishing between text data and numerical data in the string format; and saving the text data as the plurality of first strings.

5. The hierarchical file parsing method of claim 1, wherein obtaining the plurality of second strings from the plurality of candidate files through the second module comprises:

converting the plurality of candidate files from the image format to the string format;

distinguishing between text data and numerical data in the string format; and saving the text data as the plurality of second strings.

6. A hierarchical file parsing system, comprising:

a storage device configured to store a plurality of instructions, a reference string, and a plurality of files; and a computing device electrically connected to the storage device and configured to execute the plurality of instructions to perform a plurality of operations, wherein the plurality of operations comprises:

obtaining the reference string;

obtaining a plurality of first strings from the plurality of files through a first module, wherein each of the plurality of files comprises table data, the table data is in an image format and comprises a plurality of text fields and a plurality of numerical fields, the plurality of first strings is associated with the plurality of text fields, the first module executed by the computing device is an open-source table parsing tool configured to convert an image format of each of the plurality of files to a string format;

calculating a first similarity between the reference string and each of the plurality of first strings;

filtering out a plurality of candidate files from the plurality of files, wherein the first similarity of each of the plurality of candidate files is greater than a first threshold;

obtaining a plurality of second strings from the plurality of candidate files through a second module, wherein the plurality of second strings is associated with the plurality of text fields, a number of the plurality of second strings is less than or equal to a number of the plurality of first strings, the second module executed by the computing device is a cloud-based file table parsing module, and an accuracy of the cloud-based file table parsing module for the plurality of second strings is greater than an accuracy of the open-source table parsing tool for the plurality of first strings;

calculating a second similarity between the reference string and each of the plurality of second strings; and outputting one of the plurality of numerical fields according to each of the plurality of second strings when the second similarity is greater than a second threshold;

wherein each of the plurality of second strings comprises a plurality of sub-strings, and outputting one of the plurality of numerical fields according to each of the plurality of second strings when the second similarity is greater than the second threshold comprises:

selecting a candidate sub-string from the plurality of sub-strings;

comparing the candidate sub-string to a plurality of fuzzy keywords in a fuzzy keyword database to determine a weight of the candidate sub-string;

calculating a third similarity between the candidate sub-string and each artificial intelligence keyword in an artificial intelligence database;

calculating a comparison score according to the third similarity and the weight; and outputting one of the numerical fields corresponding to the candidate sub-string when the comparison score is greater than a third threshold;

wherein comparing the candidate sub-string to the plurality of fuzzy keywords in the fuzzy keyword database to determine the weight of the candidate sub-string comprises:

generating a first determination according to whether the candidate sub-string contains one of the plurality of fuzzy keywords, wherein the candidate sub-string is composed of a first portion and a second portion;

generating a second determination according to whether one of the plurality of fuzzy keywords is located in the first portion;

set the weight to a first value when the first determination is no;

set the weight to a second value when the first determination is yes and the second determination is no; and set the weight to a third value when the first determination is yes and the second determination is yes;

wherein the first value is less than the second value, and the second value is less than the third value.

7. The hierarchical file parsing system of claim 6, wherein the second threshold is greater than the first threshold.

8. The hierarchical file parsing system of claim 6, further comprising: when the first similarity is not greater than the first threshold, reducing the first threshold and re-calculating the first similarity between the reference string and each of the plurality of first strings.

9. The hierarchical file parsing system of claim 6, wherein obtaining the plurality of first strings from the plurality of files through the first module comprises:

converting the plurality of files from the image format to the string format;

distinguishing between text data and numerical data in the string format; and saving the text data as the plurality of first strings.

10. The hierarchical file parsing system of claim 6, wherein obtaining the plurality of second strings from the plurality of candidate files through the second module comprises:

converting the plurality of candidate files from the image format to the string format;

distinguishing between text data and numerical data in the string format; and saving the text data as the plurality of second strings.

* * * * *